(12) United States Patent
Girouard et al.

(10) Patent No.: US 6,557,821 B2
(45) Date of Patent: May 6, 2003

(54) CRASHPROOF INSTANT-ON VALVE

(75) Inventors: Erick Girouard, Guelph (CA); Mark W. Sajewycz, Etobicoke (CA)

(73) Assignee: Teleflex GFI Control Systems L.P., Kitchener (CA)

( * ) Notice: Subject to any disclaimer, the term of this patent is extended or adjusted under 35 U.S.C. 154(b) by 8 days.

(21) Appl. No.: 09/886,127

(22) Filed: Jun. 22, 2001

(65) Prior Publication Data

US 2002/0036278 A1 Mar. 28, 2002

(51) Int. Cl.⁷ ............................................. F16K 31/12
(52) U.S. Cl. ................... 251/30.03; 251/30.01
(58) Field of Search ......................... 251/30.03, 30.01

(56) References Cited

U.S. PATENT DOCUMENTS

| | | |
|---|---|---|
| 1,438,983 A | 12/1922 | Collin |
| 1,616,706 A | 2/1927 | Taber et al. |
| 1,625,796 A | 4/1927 | Denison |
| 1,833,981 A | 12/1931 | Wagner |
| 2,230,323 A | 2/1941 | Guyton |
| 2,267,007 A | 12/1941 | Young |
| 2,624,542 A | 1/1953 | Ghormley |
| 2,775,259 A | 12/1956 | Stiebel |
| 2,968,464 A | 1/1961 | Olson |
| 3,405,906 A | 10/1968 | Keller |
| 3,472,427 A | 10/1969 | Schaefer |
| 3,651,794 A | 3/1972 | Douglas |
| 3,710,770 A | 1/1973 | Newkirk |
| 3,885,589 A | 5/1975 | Iung |
| 3,917,218 A * | 11/1975 | Marocco .................. 251/30.03 |
| 4,006,780 A | 2/1977 | Zehr |
| 4,176,687 A | 12/1979 | Ensign |
| 4,197,966 A | 4/1980 | Wadensten et al. |
| 4,215,714 A | 8/1980 | Laue |
| 4,304,264 A | 12/1981 | McClintock et al. |
| 4,354,571 A | 10/1982 | Lakin et al. |
| 4,526,340 A | 7/1985 | Kolchinsky et al. |
| 4,679,765 A | 7/1987 | Kramer et al. |
| 4,699,351 A | 10/1987 | Wells |
| 4,744,383 A | 5/1988 | Visnic et al. |
| 4,779,837 A | 10/1988 | Mito et al. |
| 4,987,920 A * | 1/1991 | Donner .................... 251/30.03 |
| 4,988,073 A | 1/1991 | Cristiani |
| 5,018,552 A | 5/1991 | Politi et al. |
| 5,188,017 A | 2/1993 | Grant et al. |
| 5,193,580 A | 3/1993 | Wass et al. |
| 5,197,710 A | 3/1993 | Wass et al. |
| 5,263,679 A | 11/1993 | Bushnell |
| 5,301,920 A | 4/1994 | Ichiki |
| 5,341,844 A | 8/1994 | Wass et al. |
| 5,452,738 A | 9/1995 | Borland et al. |

(List continued on next page.)

FOREIGN PATENT DOCUMENTS

| | | |
|---|---|---|
| CA | 2071252 | 6/1998 |
| DE | 32 34 987 A1 | 9/1982 |
| DE | 3322-844 A | 6/1983 |
| GB | 922433 | 4/1963 |
| GB | 1064732 | 4/1967 |
| GB | 2033053 | 5/1980 |
| RU | 593039 | 2/1978 |
| WO | WO 95/06835 | 3/1995 |

*Primary Examiner*—Gene Mancene
*Assistant Examiner*—John Bastianelli

(57) ABSTRACT

A two-stage, bi-directional valve is provided for controlling gas flow into and out of a storage volume. The solenoid is provided to actuate a first stage piston to seal communication with a pressure source. In doing so, the sources imparted by the solenoid overcome biasing forces applied by a resilient spring on the first stage piston. Simultaneously, actuation of the first stage piston opens the bleed passage to permit the depressurization of space behind the second stage valve. Upon sufficient depressurization, the second stage valve is unseated from the main orifice by fluid pressure forces, thereby creating the flow path for escape of the gaseous fluid through the main orifice.

18 Claims, 6 Drawing Sheets

U.S. PATENT DOCUMENTS

| | | |
|---|---|---|
| 5,458,151 A | 10/1995 | Wass |
| 5,465,754 A | 11/1995 | Sudo et al. |
| 5,487,528 A * | 1/1996 | Richmond ............... 251/30.03 |
| 5,562,117 A | 10/1996 | Borland et al. |
| 5,599,003 A * | 2/1997 | Seemann et al. ........ 251/30.03 |
| 5,622,351 A * | 4/1997 | Kim ....................... 251/30.03 |
| 5,762,087 A | 6/1998 | Khadim |
| 5,813,652 A * | 9/1998 | Richmond et al. ....... 251/30.03 |
| 5,829,418 A | 11/1998 | Tamura et al. |
| 5,899,194 A | 5/1999 | Iwatsuki et al. |
| 6,007,049 A | 12/1999 | Wass et al. |
| 6,202,688 B1 | 3/2001 | Khadim |

\* cited by examiner

CRASHPROOF INSTANT-ON VALVE

FIELD OF INVENTION

This invention relates to gas valves, and particularly instant-on type gas valves.

BACKGROUND OF THE INVENTION

Because of environmental concerns and emissions laws and regulations, manufacturers of motor vehicles are searching for a clean burning and cost efficient fuel to use as an alternative to gasoline. Natural gas is one candidate for such a purpose, and many vehicles have been converted to natural gas as a fuel source. Typically, the natural gas is stored on board the vehicle in compressed form in one or more pressurized cylinders.

Gas flow from such pressured cylinders are controlled by valves. One major concern is the vulnerability of such gas valves to crash damage. If the vehicle is involved in an accident, the gas valve must not fail in an unsafe or catastrophic manner. To this end, internally-mounted gas valves have been designed to mitigate such unsafe or catastrophic conditions. Examples of such valves are disclosed in Wadensten et al., U.S. Pat. No. 4,197,966, Wass et al., U.S. Pat. No. 5,197,710, and Borland et al., U.S. Pat. No. 5,562,117.

Although both Wass and Borland disclose internally-mounted gas valves, these gas valves suffer from the fact that they are relatively slow in opening when downstream pressure is relatively low. Further, although the gas valve disclosed in Wadensten can be characterized as fast opening relative to the gas valves disclosed in Wass and Borland, Wadensten's valve design is complicated, requiring a relatively large number of components. Further, Wadensten's valve cannot be used for tank filling operations through the same tank nozzle, thereby necessitating a further nozzle in the associated tank for filling operations.

SUMMARY OF THE INVENTION

In one broad aspect, the present invention provides a flow control valve for controlling gas flow comprising a conduit including a first conduit orifice, a second conduit orifice, and a third conduit orifice, a primary piston, disposed within the conduit, including a primary piston valve configured to seal the third conduit orifice, a first aperture and a second aperture, and a bore extending from the first aperture to the second aperture, and configured to facilitate communication between the first aperture and the third conduit orifice, a sealing member, interposed between the conduit and the primary piston, and configured to prevent gas from flowing within the conduit between the first conduit orifice and the second conduit orifice and between the first conduit orifice and the third conduit orifice, and a secondary piston, disposed within the conduit between the primary piston and the first conduit orifice, including a first valve, configured to seal the first aperture of the primary piston, and a second valve, configured to seal the first conduit orifice.

In another aspect, the present invention provides a valve as described above, wherein the primary piston is moveable, relative to the conduit, from a first primary piston position to a second primary piston position, and wherein the third conduit orifice is sealed by the primary piston valve when the primary piston is in the first primary piston position, and wherein the third conduit orifice is in communication with the second conduit orifice when the primary piston is in the second primary piston position.

In another aspect, the present invention provides a valve as described above, wherein the secondary piston is moveable, relative to the conduit, from a first secondary piston position to a second primary piston position, and wherein the first aperture of the primary piston is sealed by the first valve when the secondary piston is in the first secondary piston position, and wherein the first conduit orifice is sealed by the second valve when the secondary piston is in the second secondary piston position, and wherein the primary piston assumes the second primary piston position when the secondary piston is in the second secondary piston position. In a further aspect, the present invention provides a valve as described above, In yet another aspect, the present invention provides a valve as described above, wherein the primary piston includes a valve seat and the first aperture is formed within the valve seat, and wherein the first valve is configured to sealingly engage the valve seat when secondary piston is in the first secondary piston position.

In a further aspect, the present invention provides a valve as described above, wherein secondary piston is biassed towards the first secondary piston position by a resilient member.

In a further aspect, the present invention provides a valve as described above, further comprising a solenoid configured to actuate movement of the secondary piston.

In a further aspect, the present invention provides a valve as described above, wherein the secondary piston is comprised of material which is responsive to electromagnetic fields.

In a further aspect, the present invention provides a valve as described above, wherein the secondary piston is comprised of magnetic material.

In a further aspect, the present invention provides a valve as described above, wherein the first aperture defines a first primary piston orifice, and wherein each of the first primary piston orifice and the first conduit orifice is characterized by a smaller cross-sectional area than the third conduit orifice.

In a further aspect, the present invention provides a valve as described above, wherein the first conduit orifice is characterized by a smaller cross-sectional area than the first primary piston orifice.

In a further aspect, the present invention provides a valve as described above, disposed within a pressure vessel.

In a further aspect, the present invention provides a valve as described above, coupled to a nozzle of the pressure vessel.

In a further aspect, the present invention provides a valve as described above, wherein the pressure vessel is characterized by a storage volume, and wherein each of the first conduit orifice and the second conduit orifice is in communication with the storage volume.

In a further aspect, the present invention provides a valve as described above, wherein the primary piston is comprised of a first part and a second part, wherein the second part is disposed remote from he third conduit orifice relative to the first part, and wherein the first part comprises non-magnetic material and the second part comprises magnetic material.

In a further aspect, the present invention provides a valve as described above, wherein the second conduit orifice is interposed between the first conduit orifice and the third conduit orifice.

In a further aspect, the present invention provides a valve as described above, wherein the sealing member is interposed between the first conduit orifice and the second conduit orifice.

By fitting the primary and secondary pistons within a single sleeve, the number of components and, therefore, the complexity of the structure is appreciably reduced. Further, the provision of a biasing means to bias the secondary pistons to close flow out of the valve permits use of passages provided within the valve for tank filling operations, thereby eliminating the requirement of a separate nozzle being provided in the tank and dedicated for filling operations.

BRIEF DESCRIPTION OF THE DRAWINGS

The invention will be better understood when consideration is given to the following detailed description thereof. Such description makes reference to the annexed drawings wherein.

DETAILED DESCRIPTION

Figure 1:
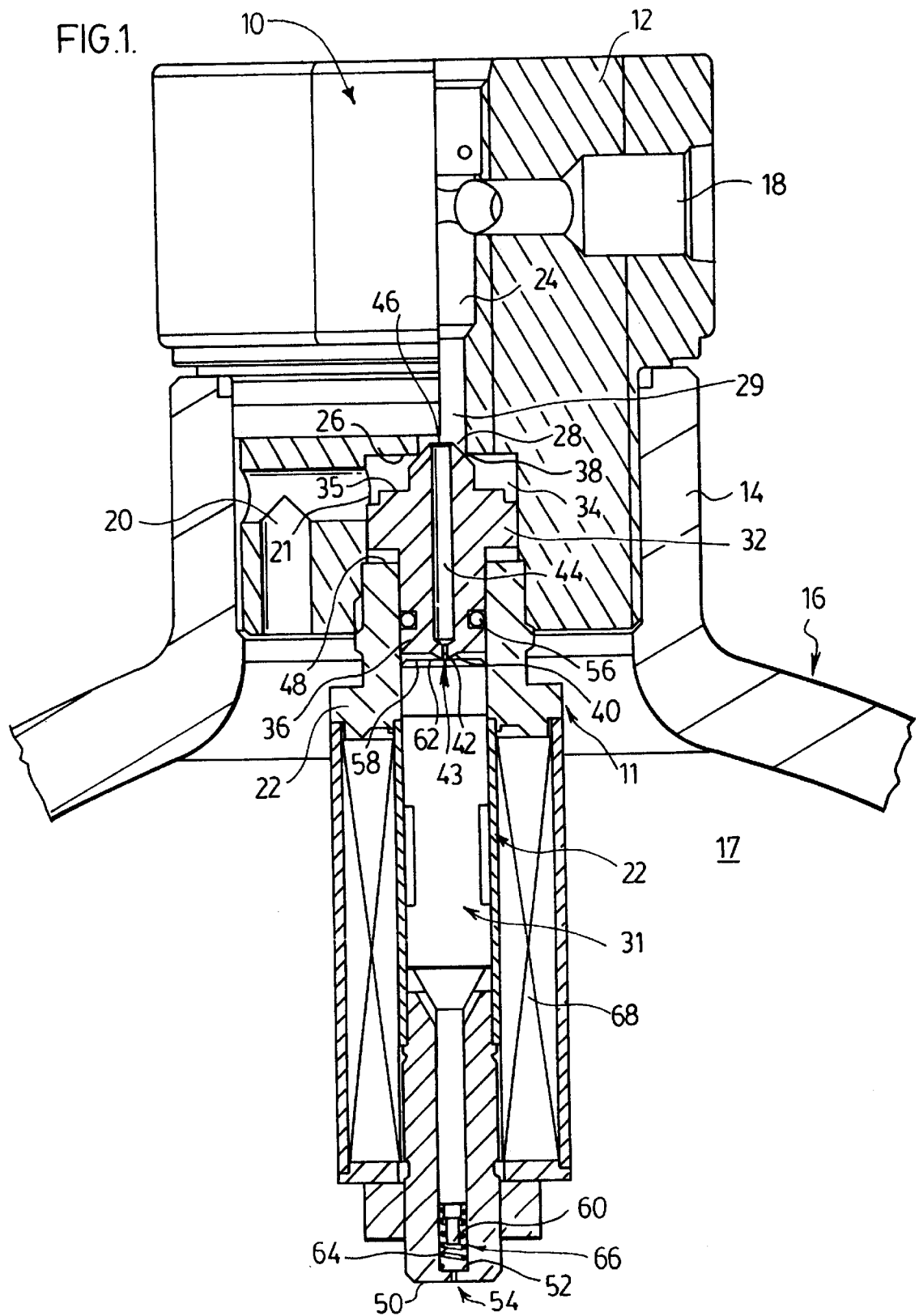
FIG. 1 is a sectional elevation view of an embodiment of an instant-on valve of the present invention showing the instant-on valve in a closed position.

FIG. 1 shows an internally-mounted instant-on valve (10) of an embodiment of the present invention. Instant-on valve (10) includes a valve body (12) configured for mounting within a nozzle (14) of a pressure vessel (16). The pressure vessel (16) includes a storage volume (17). Valve body (12) includes an outlet port (18) and an inlet port (20). A flow passage (24) extends from the outlet port (18) and through the valve body (12) and is in communication with inlet port (20). A valve seat (26) is provided in flow passage (24). Valve seat (26) defines an orifice (28). Bore (29) extends between outlet port (18) and orifice (28) and forms part of flow passage (24).

Valve body (12) includes a conduit (11). Conduit (11) includes a first conduit orifice (54), a second conduit orifice (21), and a third conduit orifice (28). Second conduit orifice (21) functions as inlet port (20).

Conduit (11) includes a sleeve (22). Primary piston (32) and secondary piston (31) are disposed and slidably carried within sleeve (22) of conduit (11), and are moveable therein. Secondary piston (31) is interposed between primary piston (32) and first conduit orifice (54). Sleeve (22) includes a first end (48) and a second end (50). First end (48) is open for communication with flow passage (24). Second end (50) includes a valve seat (52) with orifice (54) formed therein. Sidewalls (51) extend from valve seat (52) and terminate at a distal end (53) whereby second end (50) is defined. Sleeve (22) communicates with pressure vessel (16) via orifice (54).

Primary piston (32) includes a body (33) comprising a first end (34) and a second end (36). Primary piston (32) is comprised of non-magnetic material. A bore, functioning as a bleed passage (44), is disposed within body (33) and extends therethrough between a first aperture (46) at first end (34) and a second aperture (42) at second end (36). Second aperture (42) defines orifice (43). Aperture (46) opens into flow passage (24), and particularly bore (29). Aperture (42), as well as orifice (43), communicates with flow passage (24) via bleed passage (44). A sealing member (56), such as an o-ring, is carried at the periphery of body (33) between body (33) and sleeve (22) of conduit (11), thereby creating a seal to prevent gas from flowing between orifice (54) and first end (48) of sleeve (22). In this respect, primary piston (32) is sealingly engaged to conduit (11).

The first end (34) of primary piston (32) includes a valve comprising a sealing surface (38) for closing the orifice (28). The first end (34) is further characterized by a surface (35) exposed to gaseous pressure within pressure vessel (16). The second end (36) includes a valve seat (40). Orifice (43) is disposed in valve seat (40).

As is illustrated in FIG. 1, each of orifice (43) and orifice (54) is characterized by a cross-sectional area smaller than that of orifice (28). This facilitates faster unseating of primary piston (31) from valve seat (26) and unsealing of third conduit orifice (28), as will be described below.

In one embodiment, orifice (43) is characterized by a smaller cross-sectional area than orifice (54). This facilitates bleeding of gas from sleeve (22) through bleed passage (44), as will be hereinafter described.

Secondary piston (31) is disposed between primary piston (32) and first conduit orifice (54). Secondary piston (31) includes a first end (58) and a second end (60). Secondary piston (31) is comprised of magnetic material. First end (58) includes a valve comprising a sealing surface (62) for closing orifice (43). Second end (62) includes a valve comprising a second sealing surface (64) for engaging valve seat (52), thereby closing orifice (54). Resilient member or spring (66) bears against secondary piston (31) to bias secondary piston (31) towards primary piston (32) for pressing first sealing surface (62) against valve seat (40) and thereby close orifice (43). In one embodiment, spring (66) is housed at second end (50) of sleeve (22) and presses against second end (60) of secondary piston (31).

Surrounding sleeve (22) is a solenoid coil (68). Solenoid coil (68) is provided to apply electromagnetic forces on secondary piston (31) by external actuation, thereby causing movement of the secondary piston (31) against the force of spring (66) and fluid pressure forces within sleeve (22).

Figure 2:
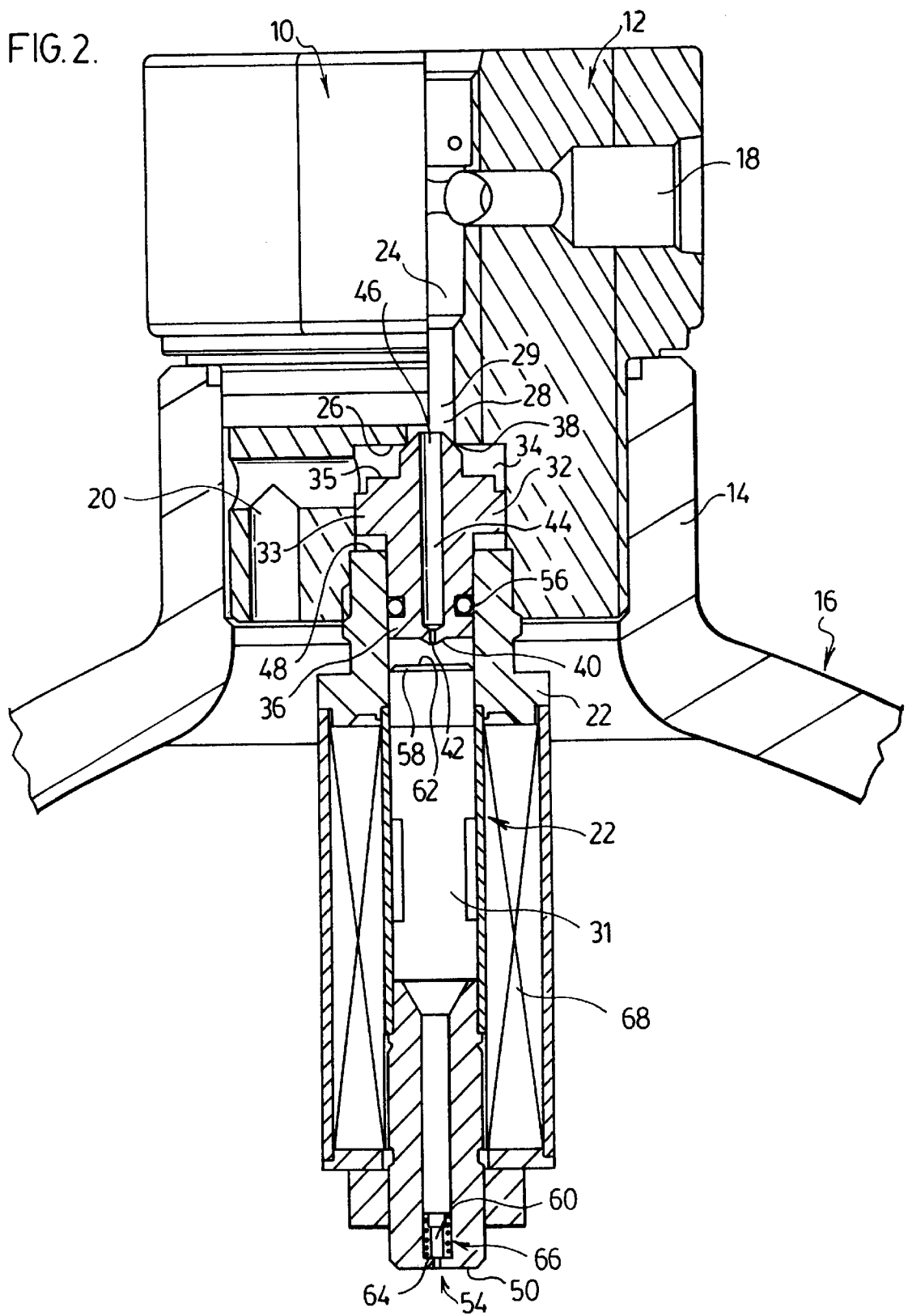
FIG. 2 is a sectional elevation view of the instant-on valve illustrated in FIG. 1, showing the instant-on valve in a transition position.
Figure 3:
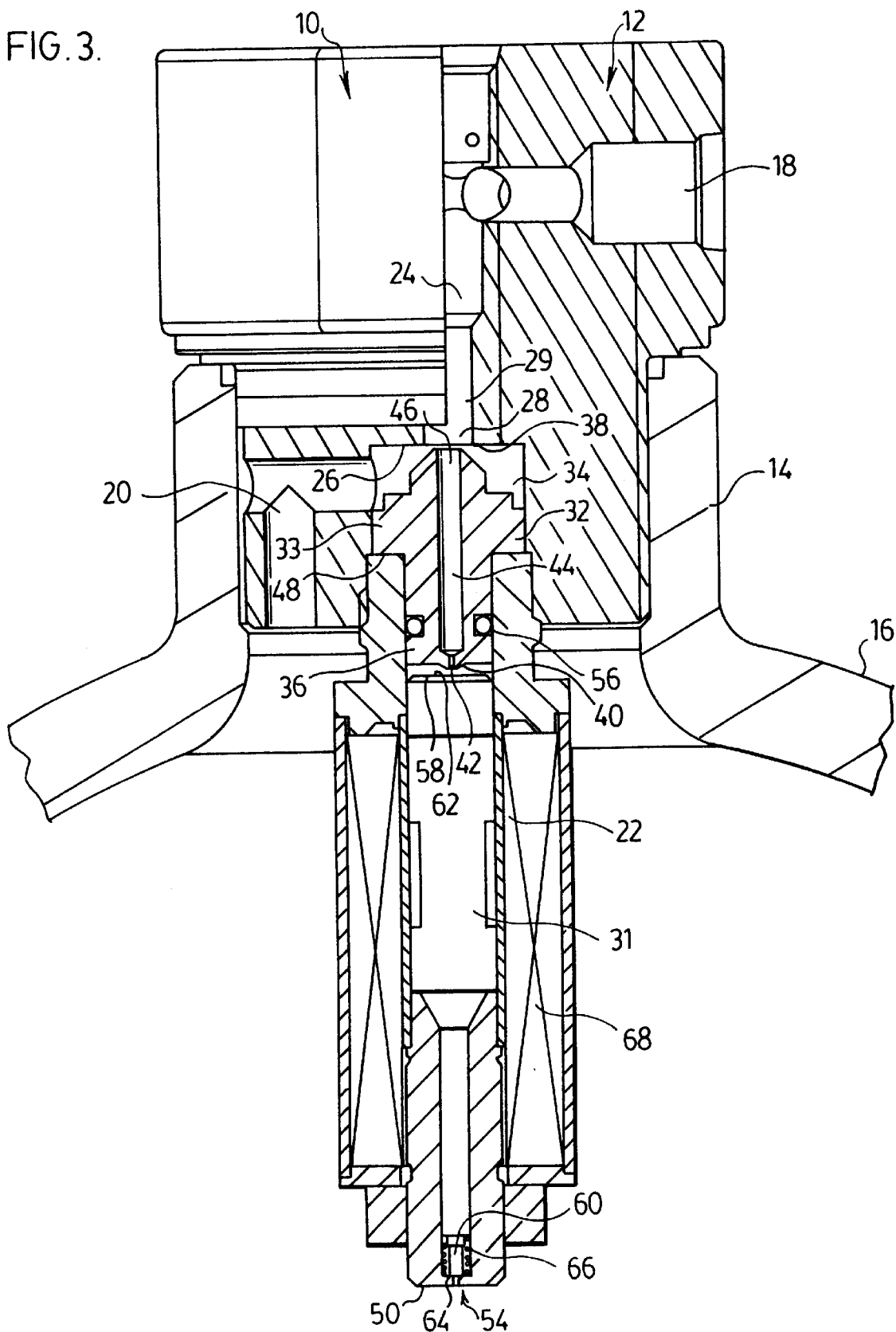
FIG. 3 is a sectional elevation view of the instant-on valve illustrated in FIG. 1, showing the instant-on valve in an open position.

FIGS. 1, 2, and 3 illustrate an embodiment of an instant-on valve (10) of the present invention in various conditions of operation. FIG. 1 illustrates instant-on valve (10) in a closed position. In this condition, solenoid coil (68) is not energized. Under these circumstances, spring (66) biases secondary piston (31) towards primary piston (32). In this respect, second sealing surface (64) is spaced from orifice (54) of valve seat (52) in sleeve (22), thereby opening orifice (54) to fluid pressure in the pressure vessel (16). Contemporaneously, first sealing surface (62) on secondary piston (31) is pressed against valve seat (40) on primary piston (32), thereby closing orifice (43). Because orifice (54) in sleeve (22) is open to fluid pressure in pressure vessel (16), the spaces between sealing member (56) and orifice (54) are also exposed to fluid pressure of pressure vessel (16). Turning to primary piston (32), first end (34) of primary piston (32) is exposed to fluid pressure within pressure vessel (16) via inlet port (20). These fluid forces, acting upon primary piston (32) are overcome by the combined action of spring (66) and fluid pressure within sleeve (22), the latter forces being translated to primary piston (32) by secondary piston (31). As such, sealing surface (38) on primary piston (32) is pressed against valve seat (26), thereby closing orifice (28).

FIG. 2 illustrates instant-on valve (10) in a transition position. Instant-on valve (10) is in a transition position moments after solenoid coil (68) is energized. Moments after solenoid coil (68) is energized, electromagnetic forces produced thereby act upon secondary piston (31) and overcome the forces exerted by spring (66) and gas pressure within sleeve (22), thereby causing second sealing surface (64) in secondary piston (31) to seat against valve seat (52) provided on sleeve (22), thereby closing orifice (54). Simultaneously, first sealing surface (62) on secondary piston (31) retracts from valve seat (40) of primary piston (32), thereby opening orifice (43). By opening orifice (43) in primary piston (32), gas contained within sleeve (22) begins to escape through bleed passage (44) within primary piston (32) via orifice (43) and flow out of instant-on valve (10) through outlet port (18). As this happens, gas pressure within sleeve (22) begins to drop. However, under these conditions, fluid pressure in this region has not dropped sufficiently to unseat primary piston (32) from valve seat (26). This is because the fluid forces acting on the surface of first end (34) of primary piston (32), including fluid forces within bore (29), are still insufficient to overcome fluid forces within sleeve (22) acting upon the surface of second end (36) of primary piston (32).

FIG. 3 illustrates instant-on valve (10) in an open position. In this condition, fluid within sleeve (22) between sealing member (56) and orifice (54) has further escaped through bleed passage (44) in primary piston (32). At this point, gaseous forces acting behind the surface of second end (36) have sufficiently subsided to have become overcome by the fluid forces acting upon the surface of first end (34) of primary piston (32). In response, sealing surface (38) of primary piston (32) has become unseated from valve seat (26), thereby creating an uninterrupted flow path between the interior of pressure vessel (16) and outlet port (18) via fluid passage (24).

Figure 4:
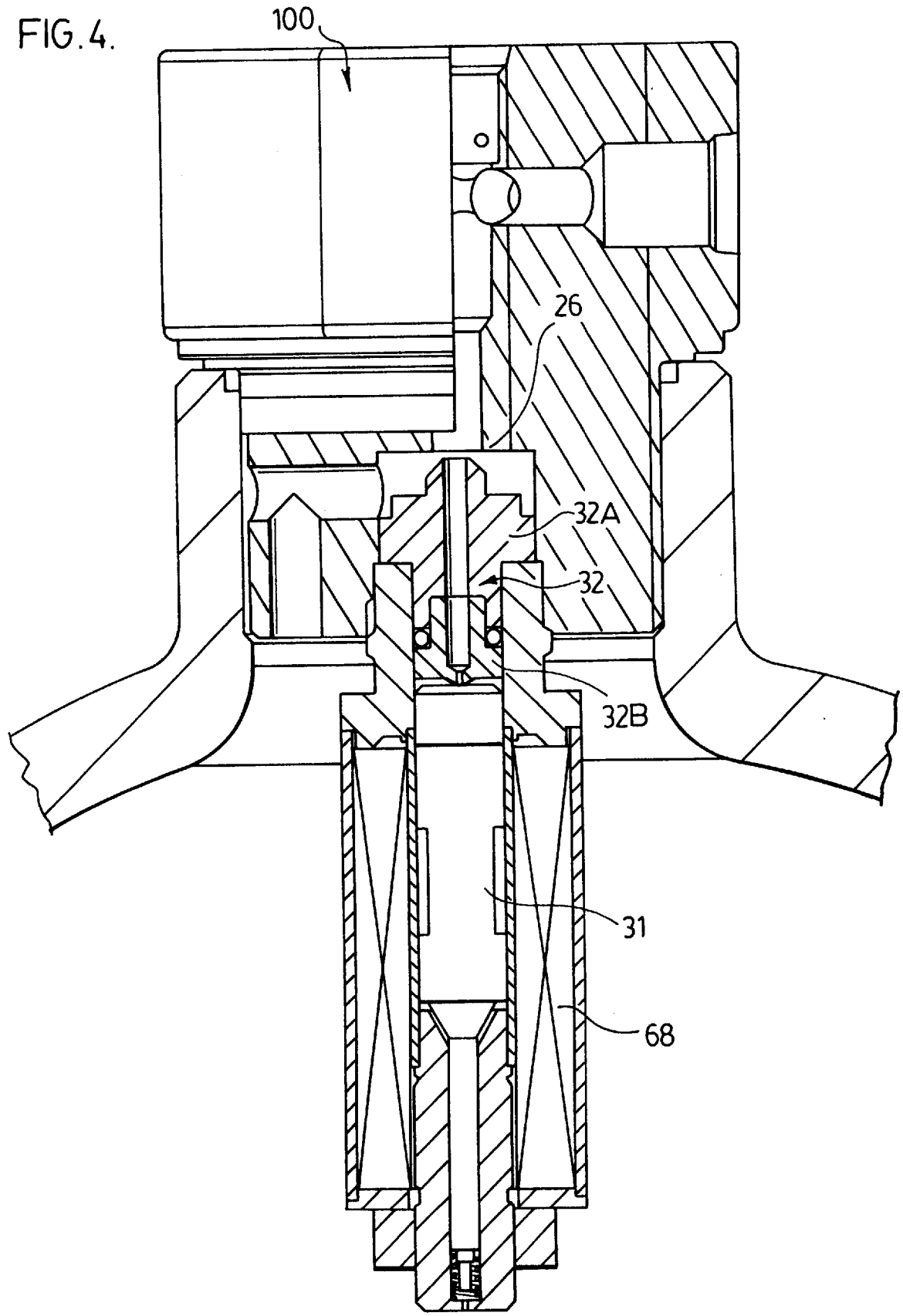
FIG. 4 is a sectional elevation view of another embodiment of an instant-on valve of the present invention.

FIG. 4 illustrates a further embodiment of an instant-on valve (100) of the present invention. Instant-on valve (100) illustrated in FIG. 4 is similar to the instant-on valve (10) illustrated in FIGS. 1, 2, and 3, in all respects except for the fact that primary piston (32) is comprised of first and second parts (32a) and (32b). First part (32a) is comprised of non-magnetic material. Second part (32b) is comprised of magnetic material. Second part (32b) is disposed remote from third conduit orifice (28) relative to the first part (32a), or between first part (32a) and secondary piston (31). First part (32a) is integral with second part (32b). In one embodiment, second part (32b) is threaded on to first part (32a). By utilizing this arrangement, primary piston (32) is unseated faster from valve seat (26) relative to the instant-on valve (10) illustrated in FIGS. 1, 2, and 3.

Figure 5:
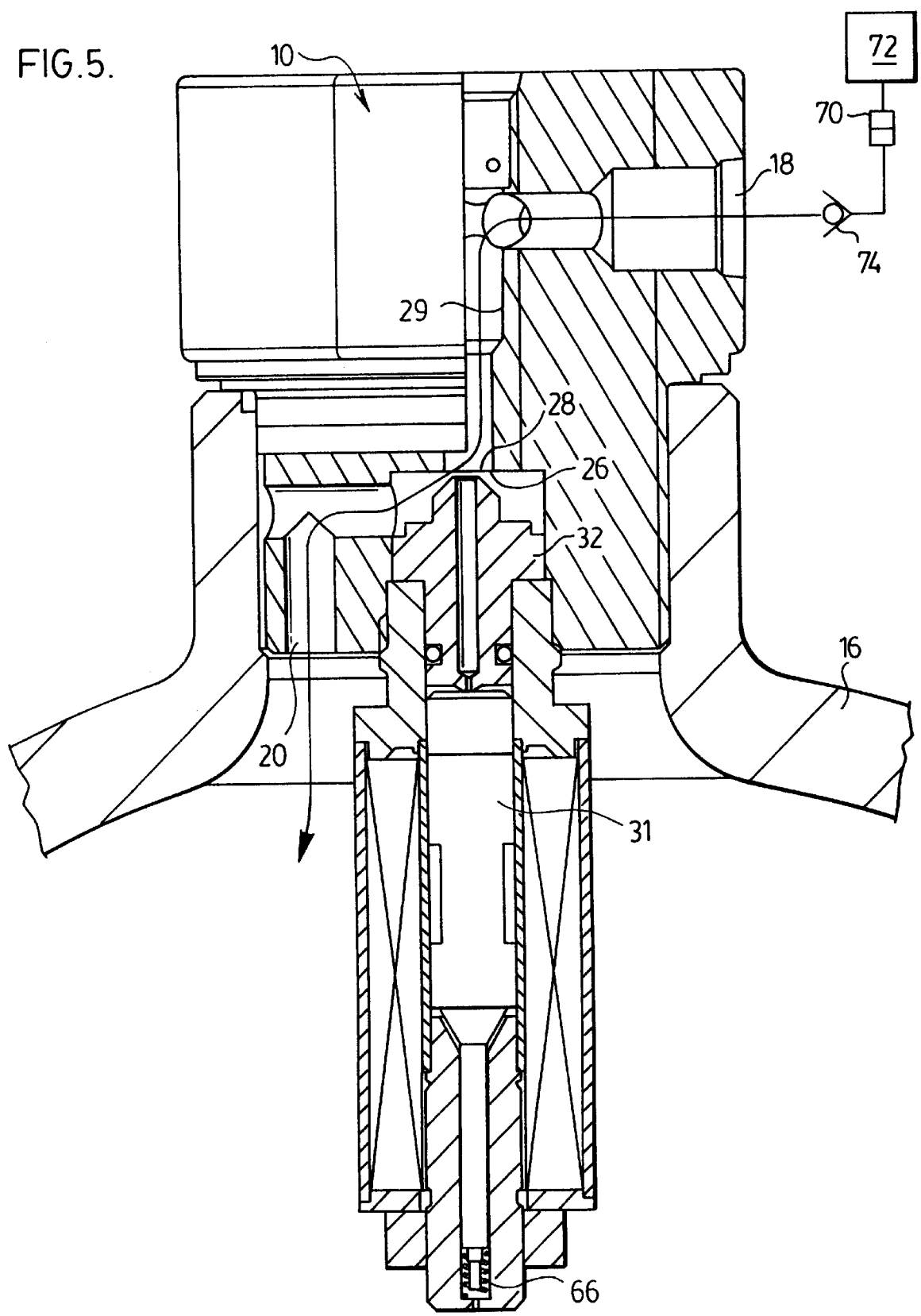
FIG. 5 is a sectional elevation view of the instant-on valve illustrated in FIG. 1, showing the flow path taken through the instant-on valve during filling of an associated pressure vessel with a gaseous mixture.

FIG. 5 illustrates the flowpath taken through instant-on valve (10) during filling of pressure vessel (16) with a gaseous mixture. Fill valve (70), which is typically a quick-connect fitting, opened to effect flow of gas from fill station (72) to pressure vessel (16). Gas flows through check valve (74) and enters instant-on valve (10) through outlet port (18) which functions as an inlet port during filling operations. From port (18), gas flows via bore (29) and through orifice (28). Gas flowing through orifice (28) presses upon primary piston (32), causing unseating of primary piston (32) from valve seat (26). As a result, an uninterrupted flowpath is created between port (18) and therefore fill station (72), and pressure vessel (16). When the filling operation is complete, spring (66) exerts sufficient force on secondary piston (31), which is thereby transmitted to primary piston (32), to cause primary piston (32) to close orifice (28).

Figure 6:
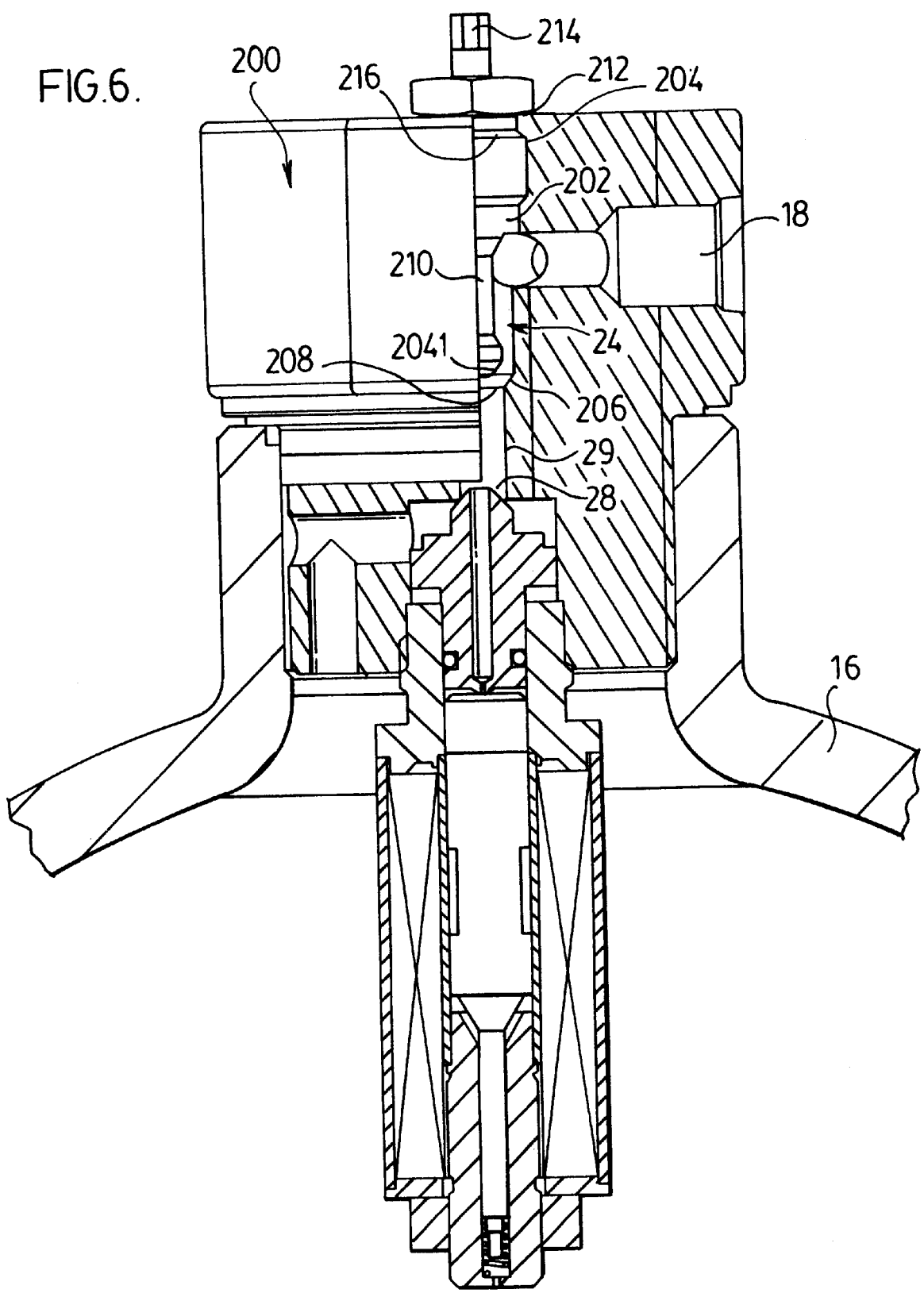
FIG. 6 is a sectional elevation view of a further embodiment of an instant-on valve of the present invention.

FIG. 6 illustrates a further embodiment of an instant-on valve (200) of the present invention. Instant-on valve (200) is identical to instant-on valve (10) illustrated in FIGS. 1, 2, and 3, in all respects except for the fact that a manual shut-off valve (202) is provided in fluid passage (24) between outlet port (18) and orifice (28), thereby permitting manual shut-off of fluid passage (24). In this respect, instant-on valve (200) includes a second bore (204) opening into first throughbore (29). First bore (29) includes a second valve seat (206) with an orifice (208) interposed between outlet (18) and orifice (28). Manual shut-off valve (202) includes a sealing surface (2041) for seating against valve seat (206), thereby closing orifice (208) and blocking flow passage (24) such that communication between outlet port (18) and inlet port (20) is interrupted. Stem (210) extends from sealing surface (2041) and through port (212) provided in pressure vessel (16) via bore (204). Manual level (214) is provided at a distal end (216) of stem (210) to facilitate closing of fluid passage (24) by manual intervention.

In one embodiment, instant-on valve (100) or (200) is designed for operation with environment characterized by an operating pressure up to 5000 psig.

Although the disclosure describes and illustrates preferred embodiments of the invention, it is to be understood that the invention is not limited to these particular embodiments. Many variations and modifications will now occur to those skilled in the art. For definition of the invention, reference is to be made to the appended claims.

What is claimed is:

1. A valve for controlling gas flow comprising:

a conduit including a fluid passage, a first port, a second port, and a third port, wherein each of the ports is disposed in fluid communication with the fluid passage;

a primary piston sealingly disposed within and moveable relative to the fluid passage, wherein the sealing disposition of the primary piston within the fluid passage defines a space within the fluid passage between the primary piston and the first port, and being configured to seal fluid communication between the second port and the third port;

a bleed passage for effecting communication between the space and the third port;

a secondary piston disposed within and moveable relative to the fluid passage, and configured to seal fluid communication between the bleed passage and the space, and also configured to close the first port;

biasing means for urging the secondary piston to: (i) become displaced from the first port and effect fluid communication between the first port and the space, and (ii) seal fluid communication between the space and the bleed passage; and a solenoid configured to apply electromagnetic forces to the secondary piston for urging the secondary piston to close the first port;

such that, while the first and second ports are disposed in fluid communication with a common fluid pressure source whose fluid pressure exceeds that of the fluid pressure source communicating with the third port, and:

(i) while the solenoid is not applying the electromagnetic forces to the secondary piston, the primary piston seals fluid communication between the second port and the third port, and the secondary piston seals fluid communication between the space and the bleed passage, and the first port is open to effect fluid communication between the first port and the space, and (ii) while the solenoid is applying the electromagnetic forces to the secondary piston, the secondary piston closes the first port, and fluid communication is effected between the space and the bleed passage, and depressurization of the space is thereby effected through the third port via the passage;

wherein the sealing disposition of the primary piston within the fluid passage prevents gas from flowing from the second port to the space during the depressurization of the space.

2. The valve as claimed in claim 1, wherein the primary piston becomes displaced to open fluid communication between the second port and the third port when the depressurization of the space enables the displacement of the primary piston by fluid pressure within the fluid passage, and thereby effect flow from the second port to the third port.

3. The valve as claimed in claim 2, herein the primary piston includes the bleed passage.

4. The valve as claimed in claim 3, wherein the primary piston further includes a primary piston sealing surface configured to effect the sealing of fluid communication between the second and third ports, a first aperture, a second aperture, and a bore extending from the first aperture to the second aperture and thereby defining the bleed passage, and wherein the secondary piston is configured to seal the first aperture of the primary piston.

5. The valve as claimed in claim 4, wherein the secondary piston includes a first sealing surface and a second sealing surface, wherein the first sealing surface is configured to seal the first aperture of the primary piston, and wherein the second sealing surface is configured to close the first port.

6. The valve as claimed in claim 5, wherein the primary piston further includes a valve seat such that the first aperture is defined by the valve seat, and wherein the first sealing surface of the secondary piston is configured to sealingly engage the valve seat.

7. The valve as claimed in claim 6, wherein the biassing means comprises a resilient member.

8. The valve as claimed in claim 7, wherein the secondary piston comprises material which is responsive to electromagnetic fields.

9. The valve as claimed in claim 8, wherein the secondary piston does not extend through the first inlet port when the second sealing surface of the secondary piston closes the first port.

10. The valve as claimed in claim 9, wherein the primary piston further includes a sealing member configured to effect the sealing disposition of the primary piston within the fluid passage.

11. The valve as claimed in claim 10, wherein the sealing member is disposed between (i) the first port, and (ii) the second port and the third port.

12. The valve as claimed in claim 11, wherein the secondary piston is disposed between the primary piston and the first port.

13. The valve as claimed in claim 4, the first aperture defines a first primary piston orifice, and the first port defines a first conduit orifice, and the third port defines a third conduit orifice, and wherein each of the first primary piston orifice and the first conduit orifice is characterized by a smaller cross-sectional area than the third conduit orifice.

14. The valve as claimed in claim 13, wherein the first conduit orifice is characterized by a smaller cross-sectional area than the first primary piston orifice.

15. The valve as claimed in claim 2, wherein the secondary piston does not extend through the first port when the secondary piston closes the first port.

16. The valve as claimed in claim 2, such that, while the first and second ports are disposed in fluid communication with a common fluid pressure source, and while the third port is communicating with a separate fluid pressure source whose fluid pressure exceeds that of the common fluid pressure source, the primary piston becomes displaced to open fluid communication between the second and third ports.

17. The valve as claimed in claim 16, the secondary piston does not extend through the first port when the secondary piston closes the first port.

18. The valve as claimed in claim 1, further comprising a solenoid, wherein the primary piston is comprised of a first part and a second part, such that the second part is disposed remote from the third port relative to the first part and the first part comprises non-magnetic material and the second part comprises magnetic material, and wherein the solenoid is configured to actuate movement of the secondary piston and the second part of the primary piston.

* * * * *

UNITED STATES PATENT AND TRADEMARK OFFICE
CERTIFICATE OF CORRECTION

PATENT NO. : 6,557,821 B1
DATED : May 6, 2003
INVENTOR(S) : Erick Girouard and Mark W. Sajewycz It is certified that error appears in the above-identified patent and that said Letters Patent is hereby corrected as shown below:

Column 7,
Line 20, replace "herein" with -- wherein --.

Column 8,
Line 12, insert -- wherein --, so that the sentence reads "The valve as claimed in claim 4, wherein the first aperture…".

Signed and Sealed this

Seventh Day of March, 2006

JON W. DUDAS
*Director of the United States Patent and Trademark Office*